US008763958B2

(12) United States Patent
Turner et al.

(10) Patent No.: US 8,763,958 B2
(45) Date of Patent: Jul. 1, 2014

(54) MULTI-ELEMENT AIRFOIL SYSTEM

(75) Inventors: Travis L. Turner, Yorktown, VA (US);
Mehdi R. Khorrami, Norfolk, VA (US);
David P. Lockard, Hampton, VA (US);
Martin J. McKenney, Virginia Beach, VA (US); Raymond D. Atherley, Norfolk, VA (US); Reggie T. Kidd, Hampton, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 311 days.

(21) Appl. No.: 13/449,807

(22) Filed: Apr. 18, 2012

(65) Prior Publication Data
US 2012/0261517 A1  Oct. 18, 2012

Related U.S. Application Data

(60) Provisional application No. 61/476,528, filed on Apr. 18, 2011.

(51) Int. Cl.
*B64C 3/50* (2006.01)
(52) U.S. Cl.
USPC ........... 244/203; 244/213; 244/214; 244/215; 244/216
(58) Field of Classification Search
USPC .................. 244/203, 213, 214, 215, 216
See application file for complete search history.

(56) References Cited

U.S. PATENT DOCUMENTS

| 1,697,674 | A | * | 1/1929 | Zimmermann | 244/215 |
|---|---|---|---|---|---|
| 6,394,396 | B2 | | 5/2002 | Gleine et al. | |
| 6,789,769 | B2 | | 9/2004 | Mau et al. | |
| 7,766,281 | B2 | | 8/2010 | Lorkowski et al. | |
| 8,006,941 | B2 | * | 8/2011 | Lorkowski et al. | 244/215 |
| 8,342,447 | B2 | * | 1/2013 | Etling | 244/90 R |
| 2011/0303796 | A1 | * | 12/2011 | Etling | 244/90 R |

OTHER PUBLICATIONS

Khorrami, Mehdi R., et al, "Unsteady flow computations of a Slat with a Blunt trailing edge," AIAA Journal, Nov. 2000, pp. 2050-2058, vol. 38, No. 11.
Singer, Bart A., et al., "Computational Aeroacoustic Analysis Slat Trailing-Edge Flow" AIAA Journal, Sep. 2000, pp. 1558-1564, vol. 38, No. 9.

(Continued)

*Primary Examiner* — Tien Dinh
*Assistant Examiner* — Justin Benedik
(74) *Attorney, Agent, or Firm* — Andrea Z. Warmbier

(57) ABSTRACT

A multi-element airfoil system includes an airfoil element having a leading edge region and a skin element coupled to the airfoil element. A slat deployment system is coupled to the slat and the skin element, and is capable of deploying and retracting the slat and the skin element. The skin element substantially fills the lateral gap formed between the slat and the airfoil element when the slat is deployed. The system further includes an uncoupling device and a sensor to remove the skin element from the gap based on a critical angle-of-attack of the airfoil element. The system can alternatively comprise a trailing edge flap, where a skin element substantially fills the lateral gap between the flap and the trailing edge region of the airfoil element. In each case, the skin element fills a gap between the airfoil element and the deployed flap or slat to reduce airframe noise.

20 Claims, 2 Drawing Sheets

(56) References Cited

OTHER PUBLICATIONS

Khorrami, Mehdi R., et al., "Time-accurate Simulations and Acoustic Analysis of Slat Free Shear Layer," AIAA Journal, Jul. 2002, pp. 1284-1291, vol. 40, No. 7.

Khorrami, Mehsi R., et al., "Time-accurate Simulations and Acoustic Analysis of Slat Free Shear Layer: Part II," 8th AIAA/CEAS Aeroacoustic Conference and Exhibit. Jun. 17-19, 2002, pp. 1-11, Breckenridge, Colorado.

Choudhari, Meelan, et al., "Slate Cove Noise Modeling: A Posteriori Analysis of Unsteady RANS Simulations," 8th AIAA/CEAS Aeroacoustic Conference and Exhibit, Jun. 17-19, 2002, pp. 1-14, Breckenridge, Colorado.

Streett, Craig L., et al., "Aerodynamic Noise Reduction for High-Lift Devices on a Swept Wing Model," 44th AIAA Aerospace Sciences Meeting and Exhibit, Jan. 9-12, 2006, pp. 1-26, Reno, Nevada.

Imamura, Taro, et al., "Designing of Slat Cove Filler as a Noise Reduction Device for Leading-edge Slat," 13th AIAA/CEAS Aeroacoustics Conference (28th AIAA Aeroacoustics Conference), 2007, pp. 1-17.

Otsuka, K. and Wayman, C. M., "Shape Memory Materials," Cambridge University Press. 1998, pp. 27-30, Cambridge, UK.

Lagoudas, Dimitris C., "Shape Memory Alloys: Modeling and Engineering Applications," Springer Science +Business Media, LLC, 2008, p. 10, New York, NY.

Imamura, Taro, et al., "Numerical and Experimental Research of Low-Noise Slat using Simplified High-Lift Model," 14th AIAA/CEAS Aeroacoustics Conference (29th AIAA Aeroacoustics Conference), May 5-7, 2008, pp. 1-18, Vancouver, British Columbia, Canada.

Imamura, Taro, et al., "A Far-field Noise and Near-field Unsteadiness of a Simplified High-lift-configuration Model (Slat)," 47th AIAA Aerospace Sciences Meeting Including The New Horizons Forum and Aerospace Exposition, Jan. 5-8, 2009, pp. 1-15, Orlando, FL.

* cited by examiner ated by cruise efficiency that is defined by adequate lift generated at cruise speeds for level flight with minimal drag. Wings having high-lift systems (e.g., leading-edge slats and/or trailing-edge flaps) are designed to augment lift and improve stall characteristics at the low speeds required for landing. These multi-element airfoil systems increase the effective chord (i.e., stream-wise dimension) of the wing and thus its effective area. However, the major effect of the multi-element airfoil arrangement is to generate a much larger pressure difference (lift) between the upper (suction) and lower (pressure) surfaces than would be possible via a single airfoil element.

MULTI-ELEMENT AIRFOIL SYSTEM

STATEMENT REGARDING FEDERALLY SPONSORED RESEARCH OR DEVELOPMENT

The invention was made in part by employees of the United States Government and may be manufactured and used by or for the Government of the United States of America for governmental purposes without the payment of any royalties thereon or therefor.

CROSS-REFERENCE TO RELATED PATENT APPLICATIONS

This patent application claims the benefit of and priority to U.S. Provisional Patent Application No. 61/476,528, filed on Apr. 18, 2011, which is incorporated by reference in its entirety.

FIELD OF THE INVENTION

This invention relates to multi-element airfoils. More specifically, the invention is a multi-element airfoil system that fills one or more gaps formed between the multiple airfoil elements in order to reduce airframe noise or otherwise affect the aerodynamic characteristics.

BACKGROUND OF THE INVENTION

Noise produced by the established unsteady flow around aircraft structures, termed airframe noise, is a significant source of aircraft noise during the landing approach phase of flight. Such unsteady flow is prominent around an aircraft's wing structures wherever geometric discontinuities are present, such as gaps, edges, and cavities. In particular, these geometric features are present when leading-edge slat devices and trailing-edge flap devices are deployed to generate high-lift. The leading-edge slats and trailing-edge flaps are extended from the main airfoil element when in the high-lift configuration, thereby feinting structural edges and gaps between the airfoil elements and garnering the terminology multi-element airfoil system. The unsteady flow resulting from the presence of the gap between the leading-edge slat and the main airfoil element is a major source of airframe noise. The unsteady flow resulting from the gap between the main airfoil element and the trailing edge flap is a secondary source of airframe noise.

Conventional transport aircraft wing design is driven mainly by cruise efficiency that is defined by adequate lift generated at cruise speeds for level flight with minimal drag. Wings having high-lift systems (e.g., leading-edge slats and/or trailing-edge flaps) are designed to augment lift and improve stall characteristics at the low speeds required for landing. These multi-element airfoil systems increase the effective chord (i.e., stream-wise dimension) of the wing and thus its effective area. However, the major effect of the multi-element airfoil arrangement is to generate a much larger pressure difference (lift) between the upper (suction) and lower (pressure) surfaces than would be possible via a single airfoil element.

During the cruise phase of flight, the multi-element airfoil system defines a smooth single-element profile to reduce drag. In current practice, the multiple airfoil elements are nested together with the leading edge of each trailing element fitting into a cove in the aft lower surface of the preceding element. When the slat and/or flap elements are deployed, gaps are formed between these elements and the main airfoil element. The unsteady aerodynamic flow resulting from these gaps is the source of considerable noise that radiates outward from the wing. It is highly desirable to develop technologies that reduce this airframe noise without compromising cruise efficiency, or lift and stall characteristics at landing. Additionally, it may be advantageous to control these gaps for other aerodynamic reasons.

SUMMARY OF THE INVENTION

Accordingly, it is an object of the present invention to provide a low-noise multi-element airfoil system.

Another object of the present invention is to provide a multi-element airfoil system that is efficient during the take-off, cruise, and landing phases of flight, and that has improved noise characteristics when the airfoil system's high-lift element(s) are deployed. In accordance with the present invention, a multi-element airfoil system includes a main airfoil element having a portion of the leading-edge region incorporating a deformable skin structurally coupled along one edge thereof to and along a spanwise portion of the main airfoil element. A slat is positioned forward of the leading-edge region. A slat deployment system is coupled to the slat and the deformable skin for simultaneously moving the slat and the deformable skin. When the slat is deployed, the deformable skin is simultaneously moved to fill the gap formed between the main airfoil element and the slat, such that the gap never forms under normal operational circumstances. When the slat is retracted, the deformable skin is simultaneously moved back into incorporation with the main airfoil element. If the airfoil system includes a trailing-edge flap, a similar structure is provided for analogous operation therewith, either independent of or in coordination with the slat.

Another object of the present invention is to provide a multi-element airfoil system comprising an airfoil element having a leading edge region. The system further comprises a slat coupled to the airfoil element, which is capable of alternating between a retracted position and an extended position. A gap is disposed between the slat and the airfoil element when the slat is disposed in the extended position. The system also includes a skin element movably coupled along the leading edge region of the airfoil element. The skin element is capable of alternating between a deployed position and a nested position. The system further includes a slat deployment system which is coupled to the slat and the skin element. The slat deployment system is capable of moving the slat between the retracted position and the deployed position. The slat deployment system is also capable of moving the skin element between the deployed position and the nested position. The skin element substantially fills the gap when the skin element is disposed in the deployed position. The system further comprises an uncoupling device for uncoupling the slat deployment system from the skin element. The uncoupling causes the skin element to move to the nested position while the slat is disposed in the extended position. The slat deployment system is capable of simultaneously moving the slat away from the leading edge region to form a lateral gap therebetween, and moving the skin element into lapped engagement with the slat to thereby span the lateral gap. The slat deployment system is capable of simultaneously (i) moving the skin element from the lapped engagement and into incorporation with the leading edge region, and (ii) moving the slat into nested engagement with the leading edge region. The system further comprises a sensor for sensing an angle-of-attack of the airfoil element. The sensor is in communication with the uncoupling device, and the sensor can cause the uncoupling device to uncouple based on the angle-of-attack of the airfoil element. The skin element may be disposed substantially adjacent to the leading edge region when the skin element is disposed in the nested position. The skin element can be moved upward and outward from the leading edge region when the skin element is moved into the deployed position. The skin element can have a spring bias toward the leading edge region and can be cantilevered from the leading edge region. In one embodiment, the skin element is hingedly coupled to the leading edge region. In another embodiment, the skin element comprises a deformable material that is capable of deforming 1-2% and may comprise a shape memory alloy (SMA). The slat can further comprise a trailing edge, where the skin element is in lapped engagement with the trailing edge when the skin element is disposed in the deployed position.

In yet another embodiment, the airfoil element of the multi-element airfoil system can include a trailing edge region, where the trailing edge region includes a second skin element movably coupled to the airfoil element. The system can also include a flap coupled to the airfoil element, and a flap deployment system coupled to the flap and the second skin element for simultaneously moving the flap and the second skin element. The system can further comprise a device for uncoupling the flap deployment system from the second skin element based on angle-of-attack of the airfoil element. The second skin element can comprise a shape memory alloy. The deformable skin can be spring-biased for incorporation with the leading edge region.

It is another object of the present invention to provide a multi-element airfoil system that closes the gap between the trailing edge of the slat (or the leading edge of the flap) and the main airfoil element to provide a continuous surface for the flow on the low-pressure surface of the airfoil. The gap filling-deformable skin of the present invention is fail-safe. The deformable skin is capable of retracting while the slat or flap is in its deployed state to re-create the gap during certain flying conditions, such as emergency situations, where there is an urgent need for high lift and/or increased angle of attack.

DETAILED DESCRIPTION OF THE INVENTION

Figure 1:
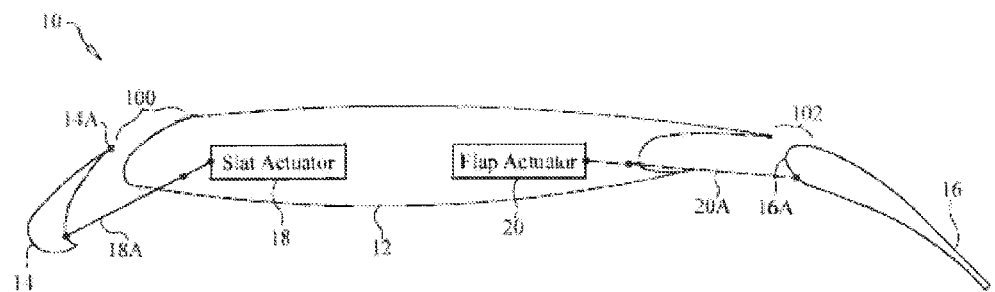
FIG. 1 is a chord-wise schematic view of an airfoil system depicting the gap which occurs between the slat and flap, and the airfoil when the slat and flap are deployed.

Referring now to the drawings, a multi-element airfoil system is illustrated schematically and is referenced generally by numeral 10. For clarity of illustration, the particular shapes of the various elements and/or their relative sizes are not limitations of the present invention as the shapes and sizes of the elements presented in the drawings merely facilitate a description of the present invention.

Figure 2:
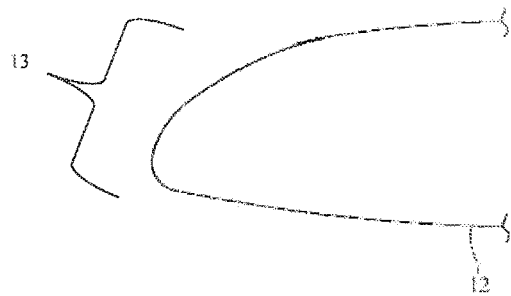
FIG. 2 is a is an isolated view of the leading edge region of the main airfoil element.

As shown in FIGS. 1 and 2, airfoil system 10 includes a main airfoil element 12, a deployable slat 14 spanning a portion of a leading edge region 13 of main airfoil element 12, and a deployable flap 16 spanning a portion of the trailing edge region of main airfoil element 12. While some multi-element airfoil systems only make use of a deployable flap or a deployable slat, many transportation aircraft have airfoil systems using both slats and flaps. Accordingly, the present invention will be described for both deployable slats and flaps, but it is to be understood that the present invention can be used in conjunction with multi-element airfoils having only deployable slats or only deployable flaps. In addition and as would be well understood in the art, multiple individual slats 14 and flaps 16 could be distributed along the span of main airfoil element 12. Accordingly, the spanwise configuration of slat 14 and/or flap 16 as illustrated herein is an embodiment of the present invention.

Figure 3:
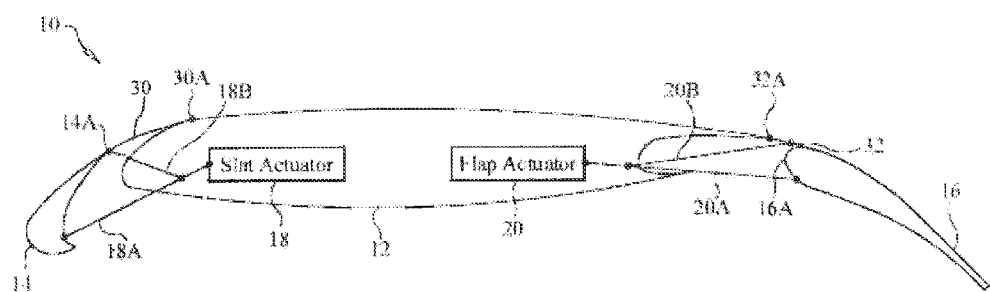
FIG. 3 is a chord-wise schematic view of a low-noise multi-element airfoil system in accordance with an embodiment of the present invention.
Figure 4:
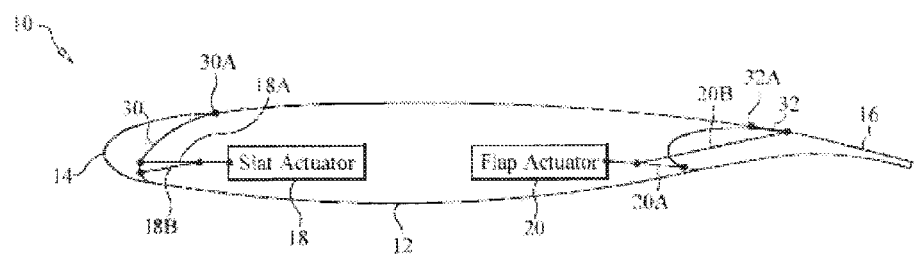
FIG. 4 is a chord-wise schematic view of a low-noise multi-element airfoil system in accordance with an embodiment of the present invention.

Airfoil system 10 includes a slat actuator 18 (e.g., hydraulic, electric, etc.) coupled (as indicated by coupling line 18A) to slat 14. Actuator 18 is operated during the flight regime to deploy slat 14 forward and downward (as shown in FIGS. 1 and 3) from main airfoil element 12 when high-lift is needed, and to retract slat 14 to nest with the leading edge region 13 (as shown in FIGS. 2 and 4) of main airfoil element 12 when cruise efficiency is paramount or when the aircraft is at rest. When slat 14 is deployed as shown in FIG. 1, a gap 100 is formed between the trailing edge 14A of slat 14 and main airfoil element 12. The unsteady flow in the vicinity of and resulting from gap 100 is a prominent source of noise generation as is known in the art.

In a similar fashion, a flap actuator 20 is mechanically coupled (as indicated by coupling line 20A) to flap 16. Actuator 20 is operated during the flight regime to deploy flap 16 aft and downward (as shown in FIGS. 1 and 3) from main airfoil element 12 when high-lift is needed, and to retract flap 16 to nest with the trailing edge of main airfoil element 12 (as shown in FIG. 4) when cruise efficiency is paramount or when aircraft is at rest. When flap 16 is deployed as shown in FIG. 1, a gap 102 is formed between the leading edge 16A of flap 16 and main airfoil element 12. The unsteady flow resulting from the presence of gap 102 is also a source of noise generation.

In accordance with the present invention, and as shown in FIG. 3, a portion of the leading edge region of main airfoil element 12 incorporates a deformable skin element 30 that is attached to main airfoil element 12. Briefly, skin element 30 is essentially incorporated with main airfoil element 12 to maintain a substantially smooth aerodynamic leading edge region 13 thereof when slat 14 is retracted, as shown in FIG. 4, or under emergency conditions when the slat 14 is deployed and gap 100 may remain open, as shown in FIG. 1. The skin element 30 is moved inward and downward toward during retraction, and is nested substantially adjacent to a leading edge region 13 (as shown in FIG. 4) of the main airfoil element 12 such that the skin element 30 essentially cups the leading edge region 13 of the main airfoil element 12 when it is fully retracted. In one embodiment, the skin element 30 is part of the main airfoil element 12, and would become flush with an exterior skin of the main airfoil element upon retraction. However, when slat 14 is deployed as shown in FIG. 3, skin element 30 is moved upward and outward away from the leading edge region 13 of the main airfoil element 12 until it is in lapped engagement below the deployed slat's trailing edge 14A to effectively seal off gap 100 illustrated in FIG. 1. In this embodiment, the skin element 30 may overlap the slat's trailing edge 14A. Alternatively, a terminal end of the skin element may be substantially adjacent to the slat's trailing edge 14A. One benefit of having the skin element 30 located substantially adjacent to the slat's trailing edge 14A, but not overlapping the slat's trailing edge 14A, is to avoid the risk of trapping the skin element 30 above the main airfoil element 12 in the event that retraction is necessary (e.g. emergency situations, landing, take-oft). Closing gap 100 at trailing edge 14A of the slat substantially or completely eliminates the gap flow and provides a continuous surface for the flow on the low-pressure (top) surface of airfoil system 10 thereby reducing noise. The large cavity presented to the flow on the high-pressure (bottom) surface of the airfoil system is not of significant consequence because the freestream flow is directed aft (downstream) of the stagnation point on main airfoil element 12.

To facilitate movement of skin element 30, it is movably attached to main airfoil element 12 in the spanwise dimension thereof as indicated at 30A. The skin element 30 is optionally placed at an upper portion of the leading edge region 13 of the main airfoil element 12. Attachment 30A could be realized by a mechanical hinge or a flexible material joint without departing from the scope of the present invention. To move skin element 30 between its retracted position (FIGS. 1 and 4) and its deployed position (FIG. 3), a separate actuator (not shown) can be used. However, to minimize weight and complexity of airfoil system 10, movement of skin element 30 can be linked to the deploying/retracting movement generated by slat actuator 18 as indicated by coupling line 18B. That is, when coupling 18A deploys/retracts slat 14, coupling 18B simultaneously deploys/retracts skin element 30. In one embodiment, the mechanism uses an intermittent gear (e.g. Geneva drive or Maltese cross) to actuate the deployment/refraction. A variety of embodiments of coupling 18B could be utilized without departing from the scope of the present invention. For example, in terms of retro-fitting the present invention on existing aircraft, coupling 18B could be designed to cooperate with an existing coupling 18A. For new aircraft designs, couplings 18A and 18B could be designed as a combined deployment system.

As mentioned above, some multi-element airfoils do not have a slat at the leading edge thereof and instead have deployable flap. In this embodiment, airfoil system 10 could include elements to close gap 102 when flap 16 is deployed. More specifically, the trailing edge region of main airfoil element 12 incorporates a deformable skin 32 that is attached to main airfoil element 12. Similar to skin element 30, skin element 32 is incorporated with main airfoil element 12 to maintain a smooth aerodynamic trailing edge region thereof when flap 16 is retracted (FIG. 4), and is moved into lapped engagement with the flap's leading edge 16A to effectively seal off gap 102 when flap 16 is deployed (FIG. 3). Skin element 32 is attached to main airfoil element 12 (e.g., via hinge, flex joint, etc.) in the spanwise dimension thereof as indicated at 32A. Skin element 32 can be deployed/retracted in accordance with the deploying/retracting movement of coupling 20A as indicated by coupling 20B. Note that the configuration of the trailing edge region of main airfoil element 12 and flap 16 may require the use of a flexible skin element 32 such that skin element 32 could be furled, folded, etc., during the deployment and retraction thereof. In this way, skin element 32 could have a sufficient fore-to-aft dimension for sealing off gap 102 and forming a smooth surface between mail airfoil 12 and flap 16 when deployed, while being collapsible during retraction of flap 16.

The strain induced during articulation of the skin element(s) 30, 32 will depend on the size and shape of the main airfoil element 12 and slat 14/flap 16. The skin element(s) 30, 32 may comprise a deformable or non-deformable material, which may be hingedly coupled to the main airfoil element 12, cantilevered from the main airfoil element 12 and/or coupled by a flexible joint to the main airfoil element 12. In one embodiment, the present invention will utilize materials having deformation potential of about 0.1-7%, or more specifically 1-2%. Strains up to approximately 7% (depending on fatigue requirements) can be achieved by superelastic shape memory alloys (SMAs). A SMA of near-equiatomic alloy of nickel and titanium, called Nitinol, may be utilized for the skin elements in the present invention. The deformation capability of the material will vary depending on the geometry of the slat/flap, geometry of the main airfoil element, spacing (e.g. gap and overhang) between the slat/flap and the main airfoil element 12, etc. SMA materials exhibit a phase transformation between a high-temperature (typically cubic) microstructure called austenite and a low-temperature (typically monoclinic, orthorhombic, or tetragonal) microstructure called martensite in response to changes in temperature and applied stress. The material behavior being exploited in this application is superelasticity where the material is in the austenitic (high-temperature) phase under all operating temperatures and in the absence of stress, and is transformed to martensite by application of stress. As is known in the art, a superelastic SMA material behaves like a linear-elastic material with increasing stress until a critical stress is reached. The microstructure begins transforming to martensite at the critical stress level and accommodates large deformation (transformation strain), up to ~7% without permanent deformation, by reorientation (detwinning) of the martensitic microstructure to variants that are consistent with the applied stress. The constitutive behavior reverts to linear-elastic response of detwinned martensite once transformation of the microstructure is complete. Removal of the applied stress is accompanied by recovery of elastic deformation in the detwinned martensite phase followed by the reverse transformation to austenite at another critical stress that is characteristically lower than that for transforming austenite to martensite. Continued reduction of the applied stress results in completion of the reverse transformation to austenite and complete recovery of all deformation, thereby returning the structure to its original configuration upon removal of all stress.

Figure 5:
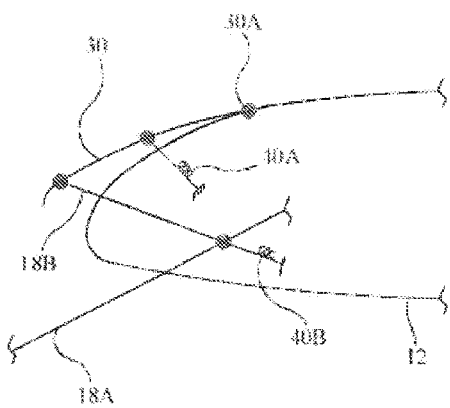
FIG. 5 is an isolated view of the leading edge region of the main airfoil element with a biasing spring coupled to the skin element and coupling.

To facilitate retraction of skin elements 30 and 32 as well as their incorporation with main airfoil element 12 to maintain a smooth aerodynamic shape therewith, skin elements 30 and 32 can incorporate a spring bias for their retracted position (FIG. 4). As shown in the isolated view of the leading edge portion of main airfoil element 12 presented in FIG. 5, such spring bias could be applied to the skin directly by a spring element 40A and/or through coupling 18B by a spring element 40B. In each case, the spring element is placed in spring tension when skin element 30 is deployed as illustrated. The spring bias of skin element 30 could also be incorporated into the design of skin element 30 without departing from the scope of the present invention. For example, the spring bias could be inherent in the material construction of skin element 30 or could be provided by an element (not shown) such as a leaf spring coupled to skin element 30. Note that the same type of spring bias could be provided in conjunction with skin element 32 to facilitate the retraction thereof and incorporation with main airfoil element 12.

Figure 6:
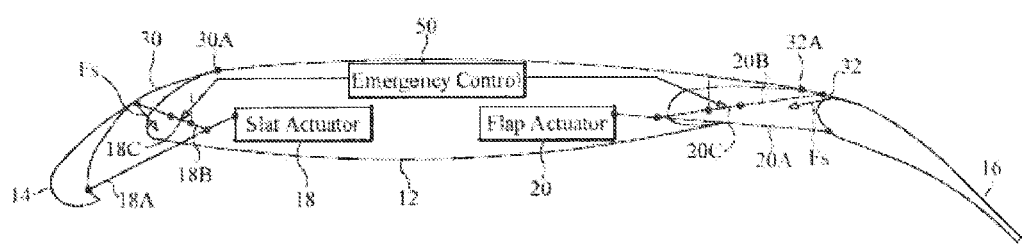
FIG. 6 is a chord-wise schematic view of a low-noise multi-element airfoil system in accordance with another embodiment of the present invention.

The present invention can also be equipped to retract skin elements 30 and 32 while slat 14 and flap 16 remain deployed to provide a fail-safe mechanism. This condition or event could be triggered by more severe angle-of-attack conditions (i.e., the angle-of-attack of main airfoil element 12) encountered during emergency situations. That is, gaps 100 and 102 may need to be opened in emergency conditions to achieve optimized lift performance at the expense of increased noise at a time when the noise is not the primary concern. Accordingly, FIG. 6 illustrates another embodiment of the present invention where each of couplings 18B and 20B can be uncoupled or switched out of engagement with the deploying/retracting movements generated by actuators 18 and 20, respectively. This is illustrated schematically by a switch 18C in coupling 18B, and a switch 20C in coupling 20B. An emergency control system 50 governs operation of switches 18C and 20C. In general, switches 18C and 20C remain closed as shown. However, in the event of an emergency that is generally indicated by a severe angle-of-attack of main airfoil element 12, emergency control system 50 opens switches 18C and 20C. Assuming skin elements 30 and 32 are spring biased as described above, a spring force $F_S$ acts thereon as shown. With switches 18C and 20C being opened, spring force $F_S$ will cause skin elements 30 and 32 to be retracted to their positions illustrated in FIG. 4. It is to be understood that switches 18C and 20C are representative of any structure or mechanism that uncouples skin elements 30 and 32, respectively, from the movement and control initiated by actuators 18 and 20, respectively.

The system may further include a sensor for triggering retraction/deployment of the skin elements 30, 32. The sensor may be in communication with the skin elements 30, 32 and/or the emergency control system 50. It is contemplated that the sensor can sense severe angle-of-attack conditions encountered during emergency situations and trigger the retraction of the skin elements 30, 32 to open the gap 100/102 and provide optimized lift performance.

The advantages of the present invention are numerous. By filling the gaps created during deployment of high-lift devices, the airfoil system of the present invention eliminates a prominent source of airframe noise. The skin elements that fill the gaps are deployed/retracted in coordination with the corresponding high-lift devices. The airfoil system can also be equipped for fail-safe operation in the event of an emergency condition.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed is:

1. A multi-element airfoil system comprising:
an airfoil element having a leading edge region;
a slat coupled to said airfoil element and capable of alternating between a retracted position and an extended position, wherein a gap is disposed between said slat and said airfoil element when said slat is disposed in said extended position;
a skin element movably coupled to said leading edge region of said airfoil element, wherein said skin element is capable of alternating between a deployed position and a nested position;
a slat deployment system coupled to said slat and said skin element, wherein said slat deployment system is capable of moving said slat between said retracted position and said deployed position, and is capable of moving said skin element between said deployed position and said nested position, wherein said skin element substantially fills said gap when said skin element is disposed in said deployed position; and
an uncoupling device for uncoupling said slat deployment system from said skin element, wherein said uncoupling causes said skin element to move to said nested position while said slat is disposed in said extended position.

2. The multi-element airfoil system of claim 1, further comprising a sensor for sensing an angle-of-attack of said airfoil element, wherein said sensor is in communication with said uncoupling device, wherein said sensor causes said uncoupling device to uncouple based on said angle-of-attack of said airfoil element.

3. The multi-element airfoil system of claim 1, wherein said skin element is substantially adjacent to said leading edge region when said skin element is disposed in said nested position.

4. The multi-element airfoil system of claim 3, wherein said skin element is moved upward and outward from said leading edge region when said skin element is moved into said deployed position.

5. The multi-element airfoil system of claim 1, wherein said skin element has a spring bias toward said leading edge region.

6. The multi-element airfoil system of claim 5, wherein said skin element cantilevered from said leading edge region.

7. The multi-element airfoil system of claim 6, wherein said skin element is hingedly coupled to said leading edge region.

8. The multi-element airfoil system of claim 7, said slat comprising a trailing edge, wherein said skin element is in lapped engagement with said trailing edge when said skin element is disposed in said deployed position.

9. The multi-element airfoil system of claim 1, wherein said skin element is deformable.

10. The multi-element airfoil system of claim 9, wherein said skin element is capable of deforming 1-2%.

11. The multi-element airfoil system of claim 1, wherein said deformable skin comprises a shape memory alloy.

12. The multi-element airfoil system of claim 1, further comprising:
said airfoil element having a trailing edge region, wherein said trailing edge region comprises a second skin element movably coupled to said airfoil element;
a flap coupled to said airfoil element;
a flap deployment system coupled to said flap and said second skin element for simultaneously moving said flap and said second skin element; and
a device for uncoupling said flap deployment system from said second skin element based on angle-of-attack of said airfoil element.

13. The multi-element airfoil system of claim 10, wherein said second skin element comprises a shape memory alloy.

14. A multi-element airfoil system comprising:
an airfoil element having a leading edge region;
a skin element comprising a deformable material, wherein said skin element is cantilevered from said leading edge region and capable of deforming between a deployed position and a nested position;
a slat positioned substantially forward of said leading edge region; and
a slat deployment system coupled to said slat and said deformable skin, wherein said slat deployment system is capable of simultaneously moving said slat away from said leading edge region to form a lateral gap therebetween, and moving said skin element into lapped engagement with said slat to thereby span said lateral gap.

15. The multi-element airfoil system of claim 14, wherein said slat deployment system is capable of simultaneously (i) moving said skin element from said lapped engagement and into incorporation with said leading edge region, and (ii) moving said slat into nested engagement with said leading edge region.

16. The multi-element airfoil system of claim 15, wherein said skin element comprises a shape memory alloy.

17. The multi-element airfoil system of claim 9, wherein said deformable skin is spring-biased for incorporation with said leading edge region.

18. The multi-element airfoil system of claim 17, further comprising an uncoupling device in communication with said slat and said skin element, wherein said uncoupling device is capable of uncoupling said slat deployment system from said skin element based on angle-of-attack of said airfoil element.

19. A multi-element airfoil system comprising:
an airfoil element having a leading edge region;
a slat coupled to said airfoil element and capable of alternating between a retracted position and an extended position, wherein a gap is disposed between said slat and said airfoil element when said slat is disposed in said extended position;
a cantilevered skin element movably coupled along said leading edge region of said airfoil element, wherein said skin element is capable of alternating between a deployed position and a nested position;
a slat deployment system coupled to said slat and said skin element, wherein said slat deployment system is capable of moving said slat between said retracted position and said deployed position, and is capable of moving said skin element between said deployed position and said nested position, wherein said skin element substantially fills said gap when said skin element is disposed in said deployed position; and
an uncoupling device for uncoupling said slat deployment system from said skin element, wherein said uncoupling causes said skin element to move to said nested position while said slat is disposed in said extended position.

20. The multi-element airfoil system of claim 19, further comprising a sensor in communication with said uncoupling device for sensing a critical condition, wherein said sensor is capable of sensing an angle-of-attack of said airfoil and activating said uncoupling device to move said skin element to said nested position while slat is disposed in said extended position.

* * * * *